United States Patent
Cernasov (10) Patent No.: US 7,746,541 B2
(45) Date of Patent: *Jun. 29, 2010

(54) SYSTEM AND APPARATUS FOR AN ELECTROPHORETIC DISPLAY

(75) Inventor: Andrei Cernasov, Ringwood, NJ (US)

(73) Assignee: Honeywell International Inc., Morristown, NJ (US)

(*) Notice: Subject to any disclaimer, the term of this patent is extended or adjusted under 35 U.S.C. 154(b) by 1143 days.

This patent is subject to a terminal disclaimer.

(21) Appl. No.: 11/373,276

(22) Filed: Mar. 13, 2006

(65) Prior Publication Data

US 2007/0211017 A1 Sep. 13, 2007

(51) Int. Cl.
G02B 26/00 (2006.01)

(52) U.S. Cl. ........................ 359/296; 359/245

(58) Field of Classification Search ................... 359/296
See application file for complete search history.

(56) References Cited

U.S. PATENT DOCUMENTS

| | | | |
|---|---|---|---|
| 5,293,528 A | 3/1994 | DiSanto et al. |
| 5,745,094 A | 4/1998 | Gordon, II et al. |
| 5,872,552 A | 2/1999 | Gordon, II et al. |
| 5,961,804 A | 10/1999 | Jacobson et al. |
| 6,144,361 A | 11/2000 | Gordon, II et al. |
| 6,172,798 B1 | 1/2001 | Albert et al. |
| 6,271,823 B1 | 8/2001 | Gordon, II et al. |
| 6,337,761 B1 | 1/2002 | Rogers et al. |
| 6,525,865 B2 | 2/2003 | Katase |
| 6,525,866 B1 | 2/2003 | Lin et al. |
| 6,529,313 B1 | 3/2003 | Lin et al. |
| 6,535,326 B2 | 3/2003 | Uno |
| 6,574,034 B1 | 6/2003 | Lin et al. |
| 6,636,341 B2 | 10/2003 | Kanbe |
| 6,639,580 B1 | 10/2003 | Kishi et al. |
| 6,650,462 B2 | 11/2003 | Katase |
| 6,650,463 B2 | 11/2003 | Obikawa et al. |
| 6,677,926 B2 | 1/2004 | Biegelsen |
| 6,680,726 B2 | 1/2004 | Gordon, ll et al. |
| 6,693,621 B1 | 2/2004 | Hayakawa et al. |
| 6,710,540 B1 | 3/2004 | Albert et al. |
| 6,727,873 B2 | 4/2004 | Gordon, II et al. |
| 6,738,039 B2 | 5/2004 | Goden |
| 6,741,385 B2 | 5/2004 | Nakanishi |
| 6,750,844 B2 | 6/2004 | Liang et al. |
| 6,751,007 B2 | 6/2004 | Liang et al. |
| 6,751,008 B2 | 6/2004 | Liang et al. |
| 6,762,744 B2 | 7/2004 | Katase |
| 6,781,745 B2 | 8/2004 | Chung et al. |
| 6,788,449 B2 | 9/2004 | Liang et al. |

(Continued)

Primary Examiner—Jordan M. Schwartz
Assistant Examiner—James C Jones
(74) Attorney, Agent, or Firm—Ingrassia Fisher & Lorenz, P.C.

(57) ABSTRACT

An embodiment generally relates to a system for electronic paper. The system includes an electret substrate embedded with a plurality of charged capsules each capsule includes a plurality of charged pigment particles, where the electret substrate is charged opposite of the plurality of charged pigment particles. The system also includes a first electrode interfacing with one side of the electret substrate and a second electrode interfacing with the other side of the electret substrate. When a voltage is applied to the first and second electrodes, the plurality of charged pigment particles move in the direction of one of the first and second electrode with a polarity opposite to a charge of the plurality of the charged pigment particles.

20 Claims, 7 Drawing Sheets

U.S. PATENT DOCUMENTS

| | | |
|---|---|---|
| 6,795,229 B2 | 9/2004 | Liang et al. |
| 6,806,995 B2 | 10/2004 | Chung et al. |
| 6,816,146 B2 | 11/2004 | Harada et al. |
| 6,822,783 B2 | 11/2004 | Matsuda et al. |
| 6,829,078 B2 | 12/2004 | Liang et al. |
| 6,831,770 B2 | 12/2004 | Liang et al. |
| 6,833,943 B2 | 12/2004 | Liang et al. |
| 6,850,355 B2 | 2/2005 | Liang et al. |
| 6,850,357 B2 | 2/2005 | Kaneko et al. |
| 6,859,302 B2 | 2/2005 | Liang et al. |
| 6,862,129 B2 | 3/2005 | Matsuda et al. |
| 6,867,898 B2 | 3/2005 | Liang et al. |
| 6,873,451 B2 | 3/2005 | Ukigaya |
| 6,885,495 B2 | 4/2005 | Liang et al. |
| 6,897,996 B2 | 5/2005 | Ikeda et al. |
| 6,900,924 B2 | 5/2005 | Goden |
| 6,906,851 B2 | 6/2005 | Yuasa |
| 6,909,532 B2 | 6/2005 | Chung et al. |
| 6,922,275 B2 | 7/2005 | Ikeda |
| 7,307,779 B1 * | 12/2007 | Cernasov .................... 359/296 |
| 2002/0186450 A1 * | 12/2002 | Foucher et al. .............. 359/296 |
| 2003/0002132 A1 * | 1/2003 | Foucher et al. .............. 359/296 |

\* cited by examiner

SYSTEM AND APPARATUS FOR AN ELECTROPHORETIC DISPLAY

FIELD

This invention relates generally to display systems. More particularly, embodiments relate to an apparatus and system for an electrophoretic display.

DESCRIPTION OF THE RELATED ART

Flexible displays made with a technology known as electronic ink or E-ink™ are in the process of commercial development. While the early versions are expected to resemble simple displays that might sit by the side of a highway to warn of trouble ahead or might advertise specials at a convenience store, later versions are expected to lead to electronic books with paper-like pages and illustrations that move, newspapers that update themselves, reusable paper displays for cellular phones, disposable TV screens, and even electronic wallpaper.

Flexible displays may be divided into two classes. Generally, an encapsulated electrophoretic display includes one or more species of particles that either absorb or scatter light. One example is a system in which the capsules contain one or more species of electrophoretically mobile particles dispersed in a dyed suspending medium. Another example is a system where each capsule contains two separate species of particles are suspended in a clear suspending fluid, in which one of the species of particles absorbs light (black), while the other species of particles scatters light (white). Other extensions are possible, including more than two species of particles, with or without a dye, etc. The particles are commonly solid pigments, dyed particles, or pigment/polymer composites.

There are two general types of particle displays; the first is often referred to as a suspended particle display (SPD). In SPDs the orientation of the particles is selectively controlled to produce the optical contrast required for a display. In an electrophoretic image display (EPID), the distribution of a particle population is selectively controlled in order to produce the optical contrast required for a display. In both cases an electric field is used to control the particles. It should be noted that particles in both display types are suspended in a liquid medium, and in one case the response to the electric field is with respect to orientation, and in the other with respect to distribution.

SPDs are attractive due to their wide viewing angle, high optical transmission and ease of fabrication. With SPDs, light valve action is obtained when sub-micron sized particles with an asymmetric, plate-like shape align with an externally-applied electric field, and thus permit light to pass through (the "light" state). This alignment occurs because the external field induces a dipole moment in the molecules of the particles. In the absence of the external field, the particles orient randomly due to Brownian motion, and consequently block light (the "dark" state).

For example, crystals of iodoquinine sulfate or related compounds may be dispersed in an organic liquid, and since the crystals are dichroic, there is a large difference between the absorption in the unaligned state in comparison to the aligned state. In the absence of an applied field, the random orientation produces a bluish-black appearance, and in the aligned state there is very little absorption and good contrast can be obtained with a white background. A significant disadvantage of SPDs is that the light areas of the display must be continuously energized with the external electric field to maintain the display, thus consuming energy even when the image on the display is static. SPDs also typically lack a clear voltage threshold, and require active-matrix addressing for high resolution.

Figure 6:
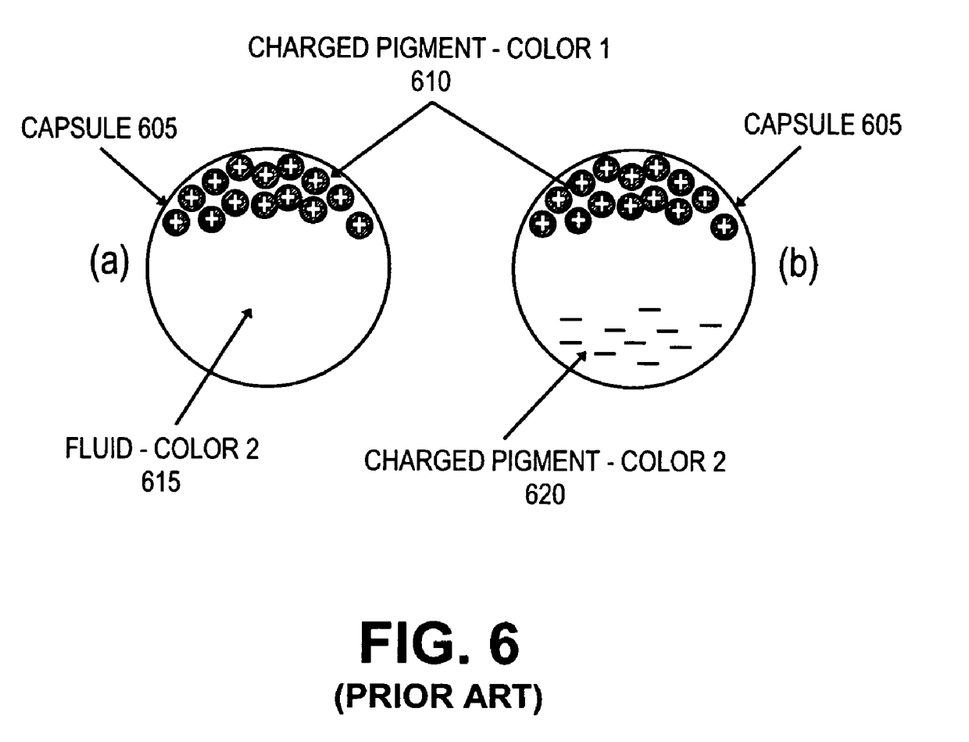
FIG. 6 illustrates a conventional electronic ink capsule.

In EPIDs, the particles (or ink capsules) used in the display are electrically charged and may either have a color that contrasts with the liquid used to suspend them, for example white particles in a dark blue dye, or may be divided into particles of two contrasting colors with opposite charge. FIG. 6 illustrates conventional particles in a typical EPID. More particularly, FIG. 6a depicts an ink capsule 605 comprised of charged pigment particles 610 of one color. The ink capsule 605 may also contain a fluid 615 of a second color. FIG. 6b depicts an ink capsule 605 with two charged pigments: charged pigment particles of one color 610 and charged pigment particles of a second color 620.

Figure 7:
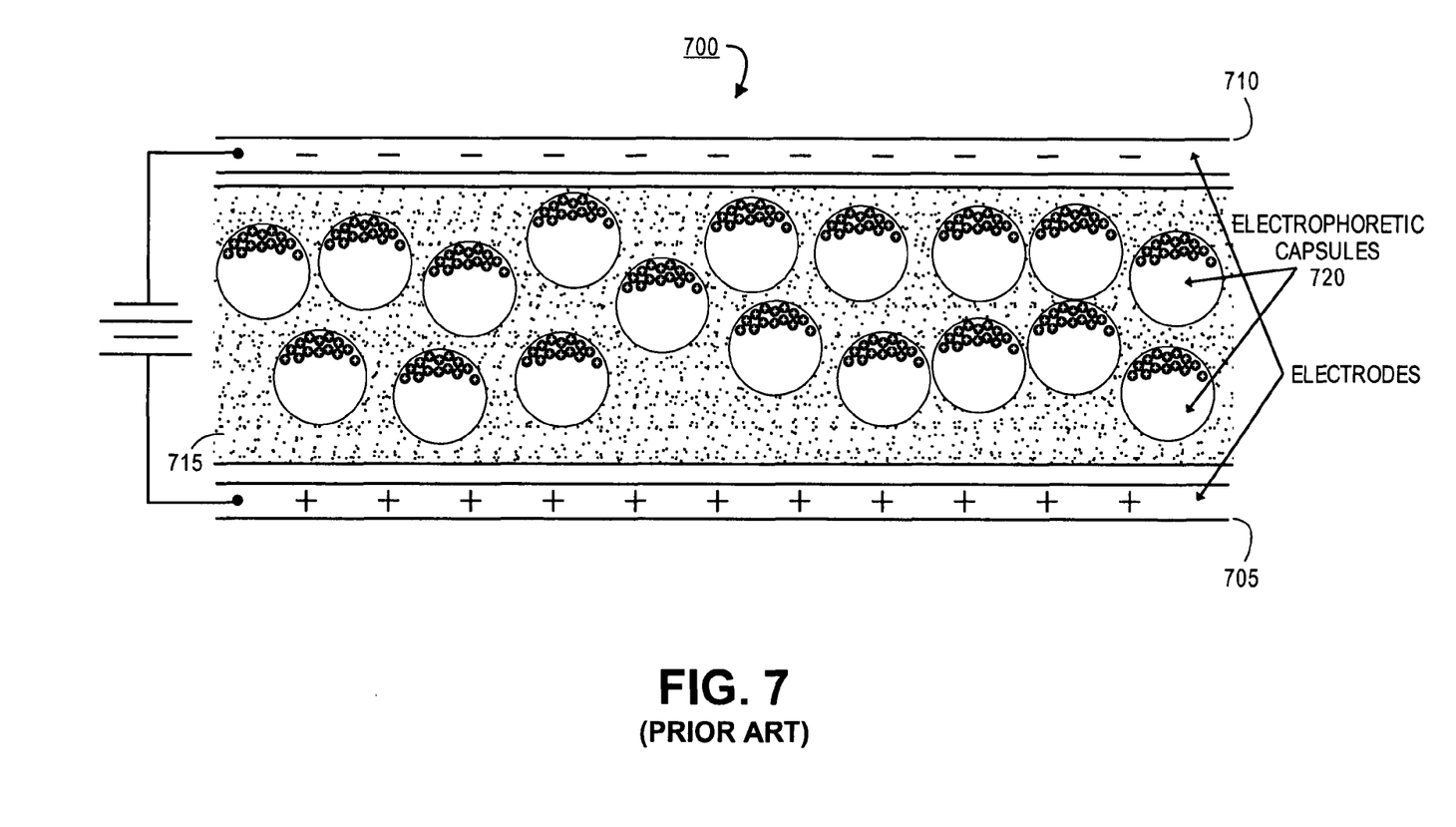
FIG. 7 illustrates a conventional electrophoresis display system for one pigment color.

FIG. 7 illustrates a conventional display system 700 with ink capsules 720, where the ink capsules contain charged pigment particles of a first color. As shown in FIG. 7, the display system 700 includes two electrodes 705, 710, respectively, and a substrate 715 (e.g., a flexible supporting film) embedded with ink capsules 720. When an electric field is applied, the charged pigment particles in the ink capsules 720 migrate to the electrode with the polarity opposite of the charge to the charge of the pigment particles, producing a light or dark region when viewed from the front.

Figure 8:
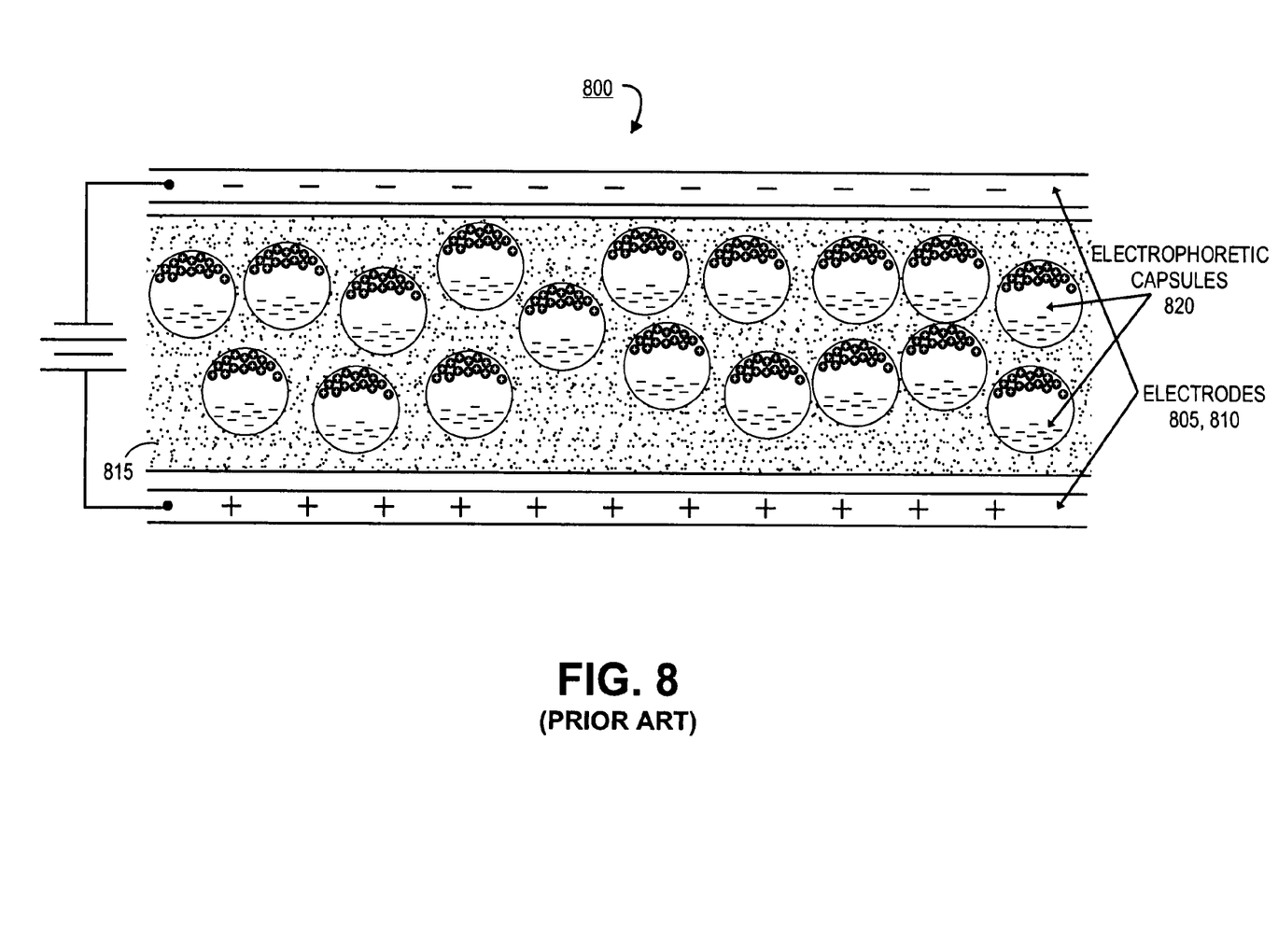
FIG. 8 illustrates a conventional electrophoresis display system for two pigment color.

FIG. 8 illustrates a conventional display system 800 with ink capsules of two colors. As shown in FIG. 8, the display system 800 includes two electrodes 805, 810, respectively, and a substrate 815 embedded with ink capsules 820, where the ink capsules 820 comprise of two types of charged pigment particles. The first type of pigment particle has a charge opposite to the second type of pigment particle. When the electric field is applied, the pigment particles in the capsules 820 move in the direction of the electrode with the polarity opposite of the charged pigment particles in the capsules 820.

The EPID generally operates by reflection and absorption as opposed to transmission. Although EPIDs have some inherent memory this memory is due to the viscosity of the liquid medium and therefore decays with time. And since there is no voltage threshold, making multiplexed displays is difficult. Thus, the need exists for a particle display that is able to retain a displayed image without an applied external field. There is also a need for a particle display that has a voltage threshold that enables multiplexing.

SUMMARY

An embodiment generally relates to a system for electronic paper. The system includes an electret substrate embedded with a plurality of capsules, where each capsule contains a plurality of charged pigment particles. The system also includes a first electrode interfacing with one side of the electret substrate and a second electrode interfacing with a second side of the electret substrate. When voltage is applied to the first and second electrodes, the plurality of charged pigment particles move in the direction of one of the first and second electrode with a polarity opposite to a charge of the plurality of the charged pigment particles.

Another embodiment generally pertains to an apparatus for an electrophoretic display. The apparatus includes a substrate embedded with a plurality of asymmetrical capsules, where each asymmetrical capsule includes a plurality of charged pigments. The apparatus also includes a first electrode interfacing with one side of the electret substrate and a second electrode interfacing with a second side of the electret substrate. The plurality of charged pigments in the plurality of asymmetrical capsules move in the direction of one of the first and second electrode with a polarity opposite to a charge of the plurality of the charged pigments when applying voltage to the first and second electrodes.

Yet another embodiment generally relates to a system for display. The system includes an electret substrate embedded with a plurality of cylindrical symmetric capsules, where each cylindrical symmetric capsule includes a plurality of charged pigment particles. The system also includes a first electrode interfacing with one side of the electret substrate and a second electrode interfacing with the second side of the electret substrate. A plurality of charged pigment particles within the plurality of cylindrical symmetrical particles move in the direction of one of the first and second electrode with a polarity opposite to a charge of the plurality of the charged pigment particles when applying voltage to the first and second electrodes.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of electrophoresis display systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Embodiments generally relate to an electrophoretic display system. More particularly, the electrophoretic display system may include a clear electret dielectric substrate. An electrically conductive film may be placed on both sides of the electret dielectric substrate configured to operate as electrodes. The electrically conductive film may be programmable, that is, be able to change the polarity on a pixel-by-pixel basis. The electret dielectric may be embedded with electronic ink capsules. The electronic ink capsules may include a plurality of charged pigments of one color (i.e., ink pigments, ink particles, ink particle pigments, etc.) in a fluid of a second color. The fluid and pigment particles may then be encased in a low (e.g., 1-2) or high (e.g., 3.5 or greater) permittivity dielectric housing. The housing may be molded into a spherically asymmetric but cylindrically symmetric shape. The clear electret dielectric substrate may be charged with electrical charge opposite in sign of the charge of the pigment particles in the electronic ink capsules. In some embodiments, the combined charge of the electret dielectric substrate may be substantially the same as the total charge of the particle pigments in the ink capsules.

When an electric field is applied, the charged pigment particles in the electronic ink capsules move either in the direction of the electric field or opposite to the electric field depending on polarity of the charge of the pigment particles. However, when the electric field is removed or when no electric field is applied, the charged pigment particles within the ink capsules maintain their position. The local electric field between the electret dielectric substrate and the charged pigments prevent movement of the pigments within the ink capsule. The local field is not homogeneous because of the asymmetry of the capsule housing and peaks when the pigment is either in the front or back of the capsule. Accordingly, each electronic ink capsule may have a bi-stable characteristic. Moreover, to change a status of a pixel, the voltage applied across the corresponding electrodes has to exceed the potential barrier of the local field. As a result, this makes multiplexing large numbers of pixels not only possible but also very simple and therefore inexpensive.

Reference will now be made in detail to embodiments of the present invention, examples of which are illustrated in the accompanying drawings. Wherever possible, the same reference numbers will be used throughout the drawings to refer to the same or like parts.

Figure 1:
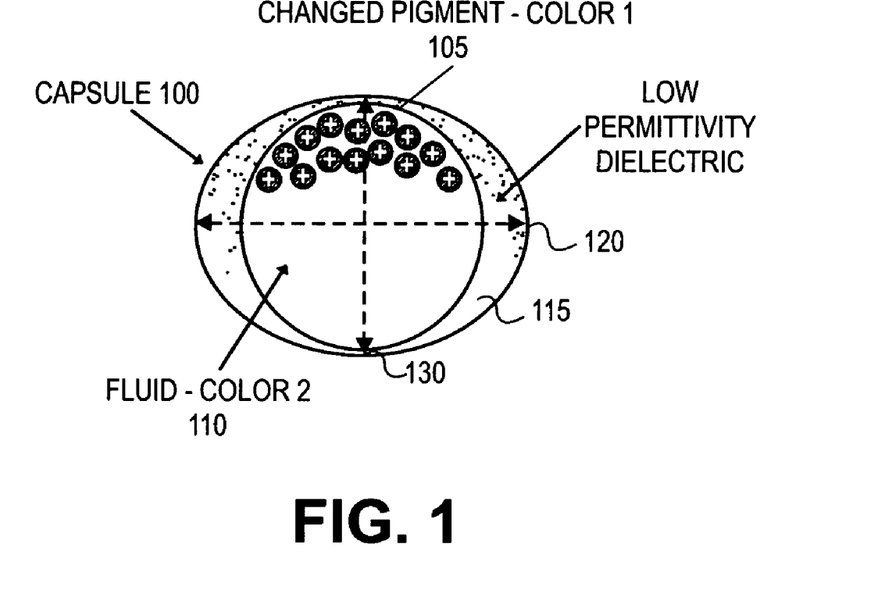
FIG. 1 illustrates an exemplary electronic ink capsule in accordance with an embodiment of the invention.

FIG. 1 illustrates a diagram of an exemplary electronic ink capsule 100 in accordance with an embodiment. As shown in FIG. 1, capsule 100 may include charged pigment particles 105 (or charged ink pigments, charged ink particles, etc.) and fluid 110, which are encased by a housing 115. The charged pigments 105 are a first color and the fluid 110 is a second color. In some embodiments, the two colors are selected for the greatest contrast effect. For example, if the first color is black, the second color would be preferably white. Accordingly, other color schemes with great contrast are contemplated for other embodiments.

For illustrative purposes only, an electronic ink capsule 100 is depicted with a reference plane 120 and an axis 130. The reference plane 120 generally surrounds the "equator" of the electronic ink capsule 100.

The housing 115 of ink capsule 100 may be implemented with a low permittivity dielectric material such as Teflon™, polyethylene or other similar material. Moreover, the housing 115 may be formed in a cylindrically symmetric shape. In some embodiments, housing 115 may be spherically asymmetric and cylindrically symmetric around axis 130. In other embodiments, the housing 115 may be implemented as part of an electret that isn't charged. More particularly, the ink capsule 100 may be embedded in a charged electret. However, a region of uncharged electret may be formed around the equator of the reference plane 120 of the ink capsule 100. The housing 115 of the ink capsule 100 may be implemented with a low permittivity material for these embodiments.

The permittivity of the housing 115 may be related to the shape and permittivity of the housing 115 as depicted in FIG. 1. More particularly, the thickness of the dielectric is the greatest around the reference plane 120 of the housing 115. Similarly, the thickness of the housing 115 is the smallest around the poles of the axis 130 of the housing 115.

Figure 2:
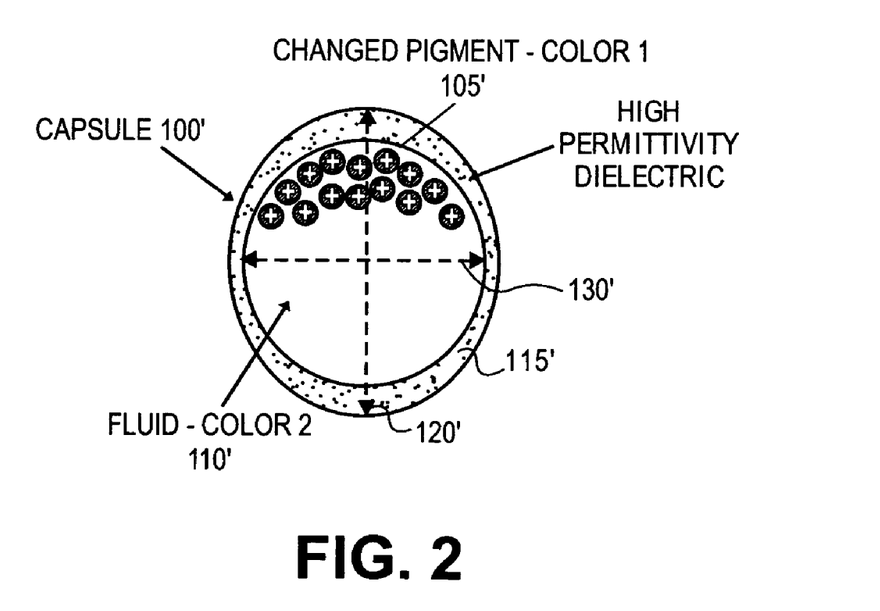
FIG. 2 illustrates another exemplary electronic ink capsule in accordance with an embodiment of the invention.

Similarly, FIG. 2 illustrates an embodiment of an exemplary electronic ink capsule 100' with a high permittivity dielectric housing. As shown in FIG. 2, capsule 100' may include charged pigments 105' and fluid 110', which are encased by a housing 1115'. The charged pigments 105' may be a first color and the fluid 110' may be a second color. Like the embodiments depicted in FIG. 1, the first and second color are selected for the contrast effect.

For illustrative purposes only, electronic ink capsule 100' is depicted with a reference plane 130' and an axis 120'.

The housing 115' of capsule 100' may be implemented with a high permittivity (e.g., greater 3.5) dielectric material. Moreover, the housing 115' may be formed in a cylindrically symmetric shape. In some embodiments, housing 115' may be spherically asymmetric and cylindrically symmetric around axis 120'. For this embodiment, a high permittivity dielectric material may used to implement the housing 115', where the thickness of the housing 115' is greatest around the poles of the axis 120' and thinnest around the equator of the reference plane 130'. In other embodiments, the housing 115' may be implemented as part of an electret that isn't charged. More particularly, the ink capsule 100' with a high permittivity housing 115' may be eventually embedded in a charged electret. However, an uncharged area surrounding the equator of the reference plane 130' may be formed around the ink capsule 100' to become a housing that is similar to housing 115 with the same orientation. Similarly, as with the embodiment in FIG. 1, for enhanced stability, the combined charge of the electret should be substantially equal to the total charge of the pigments 105' contain in the capsules 100'.

Figure 3:
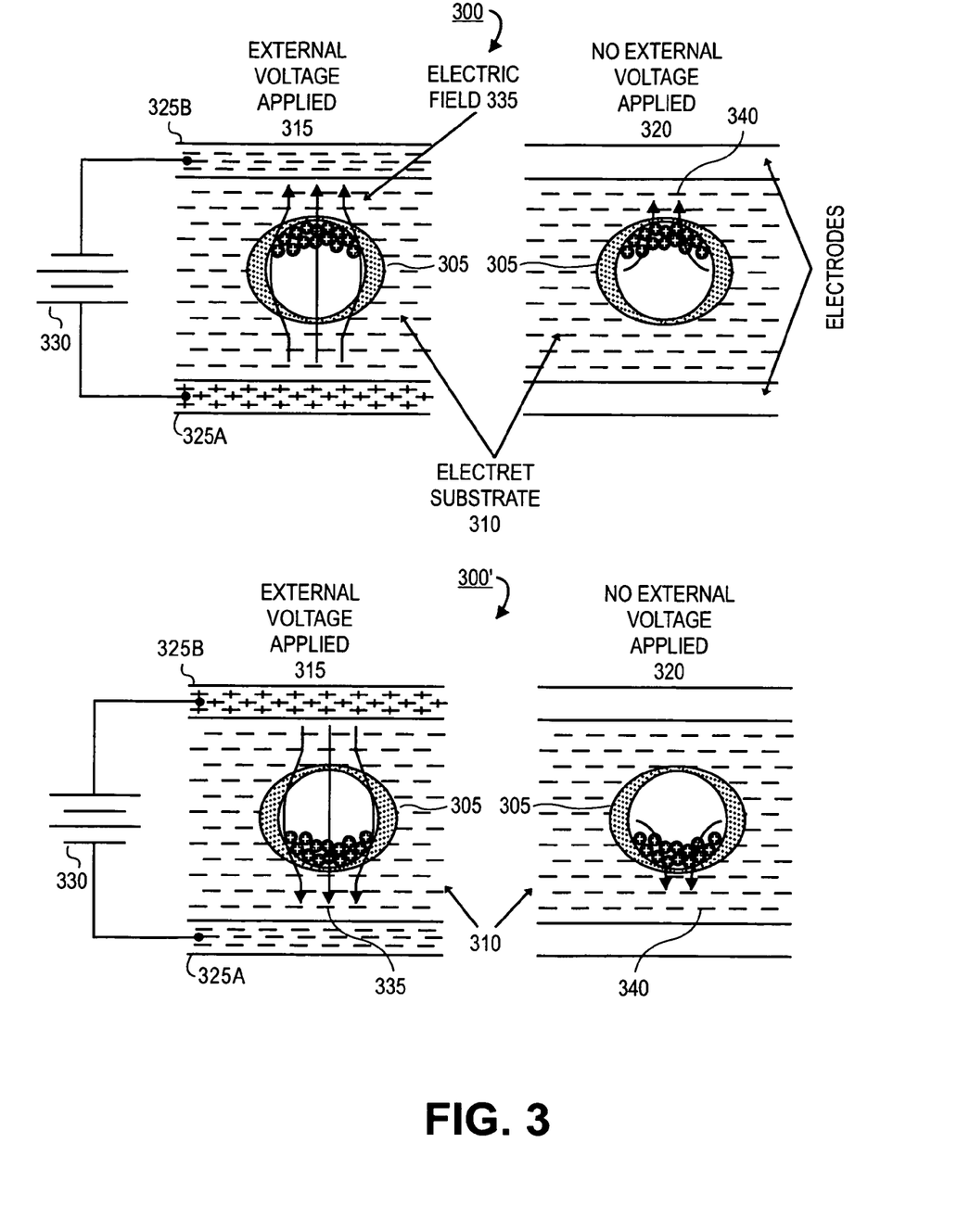
FIG. 3 depicts an exemplary system with two electric field configurations in accordance with yet another embodiment.

FIG. 3 illustrates an exemplary system 300 and 300'. For matters of simplicity, systems 300 and 300' are depicted with a single ink capsule. It well within the scope of the embodiments that each system 300 and 300' contain multiple ink capsules.

As shown in FIG. 3, the components of systems 300 and 300' are identical. More particularly, each system 300 and 300' may comprise an ink capsule 305 embedded in a charged electret substrate 310. The ink capsule 305 comprises a plurality of charged pigment particles. Electrode 325A may be interfaced with the one side of the charged electret substrate 310 and electrode 325B may be interface with the second side of the charged electret substrate 310. System 300 and 300' may also include a power supply 330. System 300 depicts a voltage applied scenario 315 where the electric field is in one direction and system 300' depicts a voltage applied scenario 315 where the electric field is reversed from system 300.

As shown in FIG. 3 for system 300, when a voltage source 330 is applied to the electrodes 325, the electrode 325A develops a positive polarity and the electrode 325B develops a negative polarity. In system 300', the electrode 325A develops a negative polarity and the electrode 325B develops a positive polarity because the power supply has been reversed.

Accordingly, an electric field 335 is developed across the electret substrate 310, which is greater than the local electric field between the charged pigments in the ink capsule 305 and the charged electret substrate 310. As a result, the charged pigments within the ink capsule 305 move toward the electrode 325B with the negative polarity in system 300 and the electrode 325A with negative polarity in system 300'. As shown in systems 300 and 300', the pigments move with the electric field 335 because the charge of the pigment particles in the ink capsule 305 is positive.

In the no voltage scenario 320 where the electric field 335 is removed, the pigment particles within the ink capsule 305 may maintain their position. The anchoring effect may be due to the local electric field 340 established between the charged pigments in the capsule 305 and the oppositely charged electret 310. The local electric field 340 is not homogeneous because of the asymmetry of the housing of the capsule 305. Rather, it peaks when the pigment is either in the front shown in system 300 or back as shown in system 300'. More particularly, when no external field across the electret substrate 310, the electric field generated around the thicker part of the low permittivity housing is smaller than the electric field generated around the thinner portions of the housing. Accordingly, this results in a net field going from the thicker portions of the housing to the thinner portions of the housing, which is illustrated by the field arrows of the local electric field 340. This property of the electric field may also give each capsule its bi-stable character.

Figure 4:
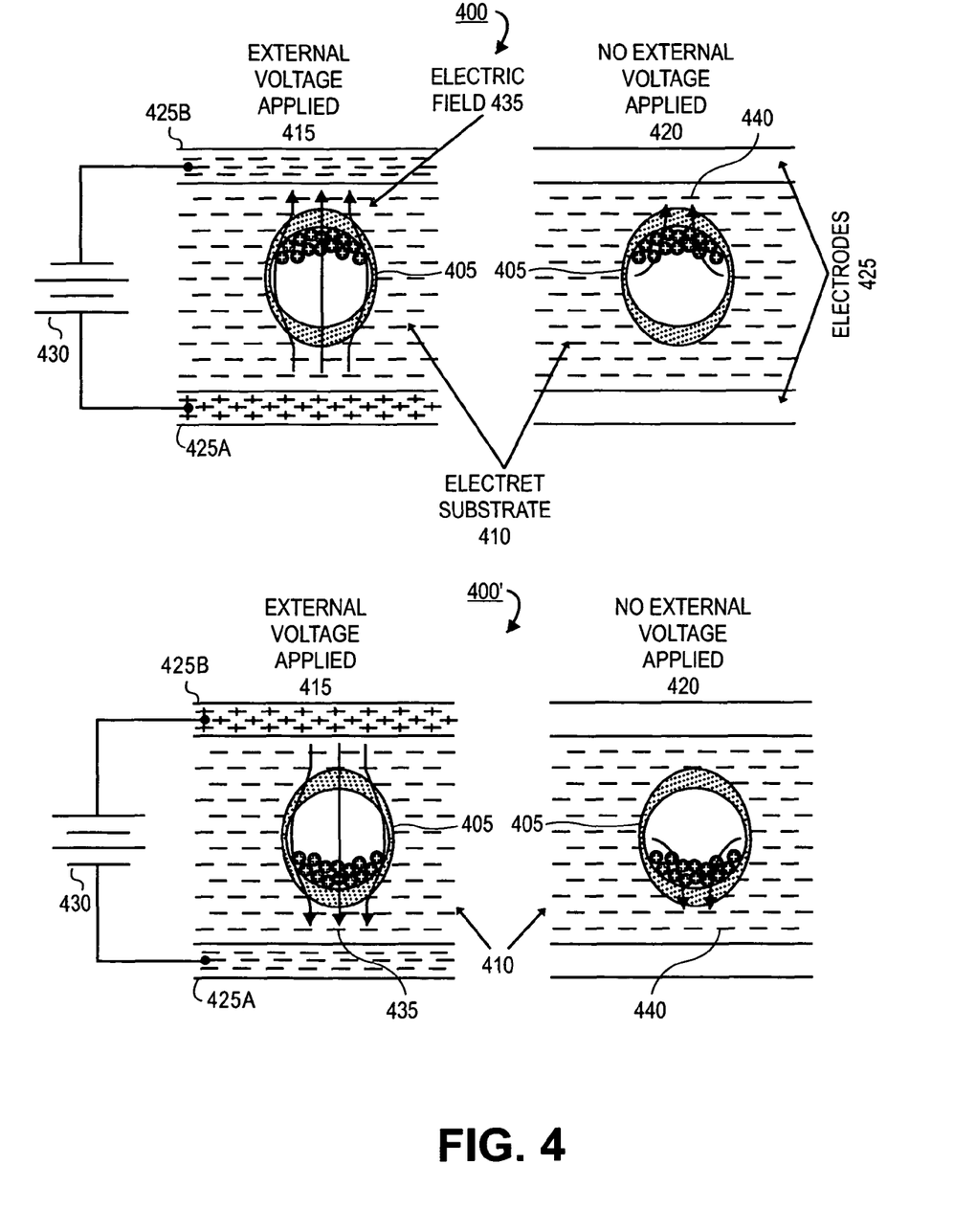
FIG. 4 illustrates another exemplary system with two electric field configuration in accordance with yet another embodiment.

FIG. 4 illustrates an exemplary system 400 and system 400' with ink capsule comprising high-permittivity housing. For matters of simplicity, systems 400 and 400' are depicted with a single ink capsule. It well within the scope of the embodiments that each system 400 and 400' contain multiple ink capsules.

As shown in FIG. 4, the components of 400 and 400' are identical. More particularly, each system 400 and 400' may comprise an ink capsule 405 with charged pigment particles embedded in a charged electret substrate 410. Electrode 425A may be interfaced with the one side of the charged electret substrate 410 and electrode 425B may be interface with the second side of the charged electret substrate 410. System 400 and 400' may also include a power supply 430. System 400 depicts a voltage applied scenario 415 where the electric field is in one direction and system 400' depicts a voltage applied scenario 415 where the electric field is reversed from system 400.

As shown in FIG. 4 for system 400, when a voltage source 430 is applied to the electrodes 425, the electrode 425A develops a positive polarity and the electrode 425B develops a negative polarity. In system 300', the electrode 425A develops a negative polarity and the electrode 425B develops a positive polarity because the power supply has been reversed.

Accordingly, an electric field 435 is developed across the electret substrate 410, which is greater than the local electric field 440 between the charged pigments and the charged electret substrate 410. As a result, the charged pigment particles within the capsule 405 move toward the electrode 425B with the polarity opposite of the charged pigment particles in system 400. In system 400', the charged pigment particles within the capsule 405 move toward electrode 425A because it has a negative polarity. As shown in system 400 and 400', the pigments move with the electric field 435 because the charge in the ink capsule 405 is positive.

In the no external voltage scenario 420 where the electric field 435 may be removed, the pigment particles within capsule 405 may maintain their position. The anchoring effect may be due to the local electric field 440 established between the charged pigments in the capsule 405 and the oppositely charged electret 410. The local electric field 440 is not homogeneous because of the asymmetry of the housing of the capsule 405. Rather, it peaks when the pigment is either in the front shown in system 400 or back as shown in system 400', from a top view of systems 400 and 400'. More particularly, when no external field is applied across the electret substrate 410, the electric field generated around the thinner part of the high permittivity housing is smaller than the electric field generated around the thicker portions of the high permittivity housing. Accordingly, this results in a net field going from the thinner portions of the housing to the thicker portions of the housing, which is illustrated by the field arrows of the local electric field 440. This property of the electric field may also give each capsule its bi-stable character.

Figure 5:
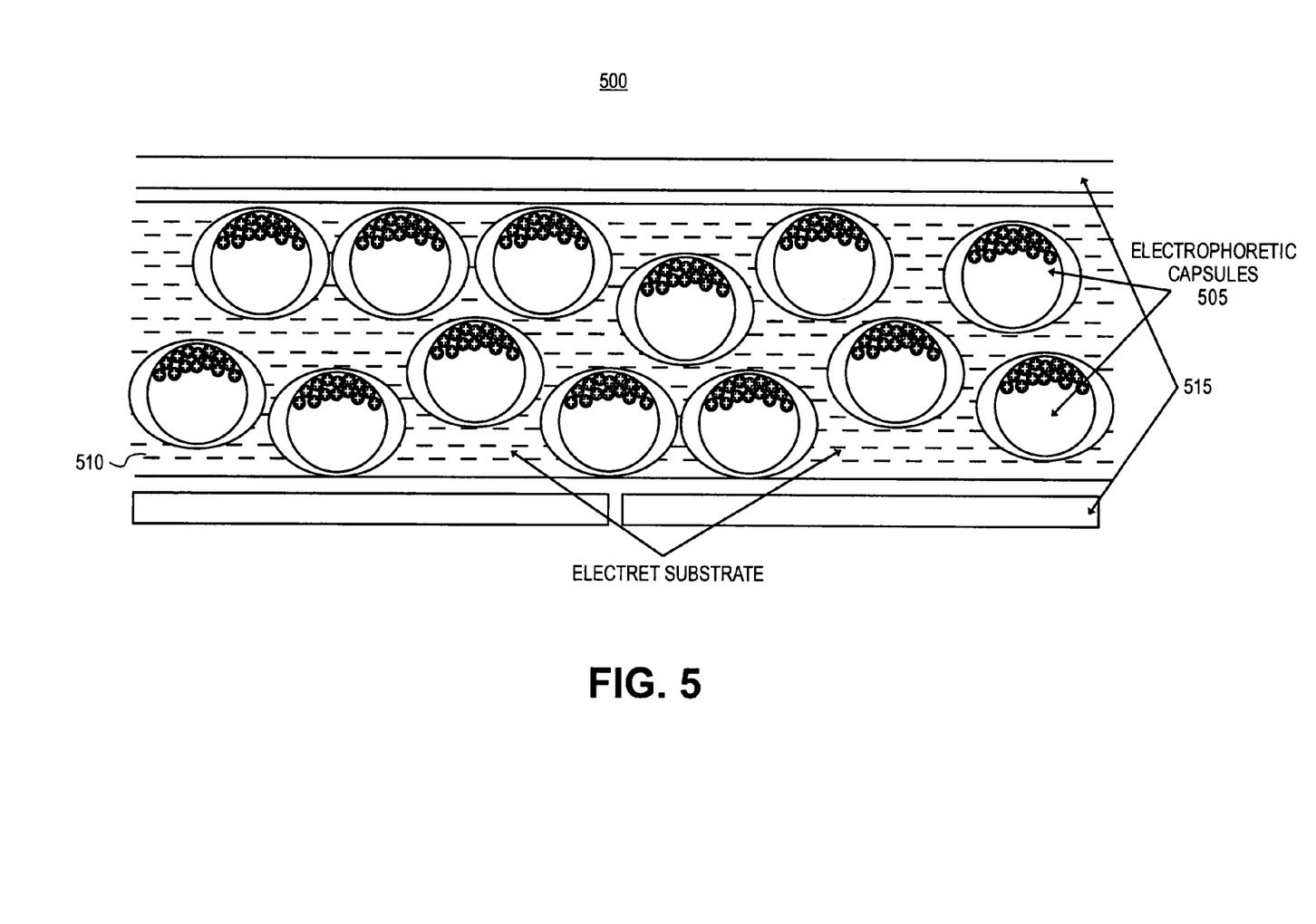
FIG. 5 illustrates another exemplary system in accordance with yet another embodiment.

FIG. 5 illustrates another exemplary system 500 in accordance with yet another embodiment. As shown in FIG. 5, the system 500 includes capsules 505, electret film 510 and a standard X-Y Indium Tin Oxide ("ITO") array 515, which is a transparent and electrically conductive coating used to address LCD pixels. The capsules 505 are embedded in the electret film 510 and the capsules 505 are loosely aligned. An example of the electret film 510 may be Teflon™. The ITO array 515 may be configured to provide control of the capsules 505 on a pixel basis.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A system for electronic paper, the system comprising:
   an electret substrate embedded with a plurality of capsules, each capsule containing a plurality of charged pigment particles;
   a first electrode interfacing with one side of the electret substrate; and
   a second electrode interfacing with a second side of the electret substrate, wherein by applying voltage to the first and second electrodes, the plurality of charged pigment particles move in the direction of one of the first and second electrodes with a polarity that is opposite of charge of the plurality of the charged pigment particles.

2. The system of claim 1, wherein capsule of the plurality of charged capsules comprises:
   the sub-plurality of charged pigment particles with a first charge and a first color;
   a fluid of a second color; and
   a housing configured to house the sub-plurality of charged pigment particles and fluid.

3. The system of claim 2, wherein the housing is implemented with a high permittivity dielectric.

4. The system of claim 2, wherein the housing is implemented with a low permittivity dielectric.

5. The system of claim 2, wherein the housing is cylindrically symmetrical.

6. The system of claim 1, wherein the first and second electrodes is a multiplexing ITO array.

7. The system of claim 1, wherein the electret substrate is electrically charged Teflon.

8. The system of claim 1, wherein a total charge of the electret substrate is substantially the same as a total charge of the plurality of charged pigment particles.

9. An apparatus for an electrophoresis display, the apparatus comprising:
   an electret substrate embedded with a plurality of asymmetrical capsules, each asymmetrical capsule comprising a plurality of charged pigments;
   a first electrode interfacing with one side of the electret substrate; and
   a second electrode interfacing with a second side of the electret substrate, wherein by applying voltage to the first and second electrodes, the plurality of charged pigments within the plurality of asymmetrical capsules move in the direction of one of the first and second electrode of a polarity opposite of the charge of the plurality of the charged pigments.

10. The apparatus of claim 9, wherein each capsule of the plurality of asymmetrical capsules is further cylindrical symmetrical.

11. The apparatus of claim 9, wherein a removal of the voltage substantially ceases the movement of the plurality of charged pigments within the plurality of asymmetrical capsules.

12. The apparatus of claim 11, wherein the plurality of charged pigments substantially remain in a same position as when the voltage was removed due to the presence of local electric fields between each capsule of the plurality of charged pigments and the substrate.

13. The apparatus of claim 9, wherein each capsule of the plurality of asymmetrical capsule comprises a housing that encases the plurality of charged pigments.

14. The apparatus of claim 13, wherein the housing is implemented with a low permittivity dielectric in a cylindrical symmetric configuration where a first thickness of the low permittivity dialectic is largest around an axis and a second thickness of the low permittivity dielectric is smallest around a reference plane.

15. The apparatus of claim 13, wherein the housing is implemented with a high permittivity dielectric in a cylindrical symmetric configuration where a first thickness of the high permittivity dialectic is smallest around an axis and a second thickness of the high permittivity dielectric is largest around a reference plane.

16. The apparatus of claim 9, wherein the substrate is one of a class of polyethene materials.

17. A system for display, the system comprising:
   an electret substrate embedded with a plurality of cylindrical symmetric capsules, each cylindrical symmetric capsule comprising a plurality of charged ink pigments;
   a first electrode interfacing with one side of the electret substrate; and
   a second electrode interfacing with a second side of the electret substrate, wherein by applying voltage to the first and second electrodes, the plurality of charged ink pigments within the plurality of cylindrical symmetrical capsules move in the direction of one of the first and second electrode with a polarity opposite to a charge of the plurality of the charged ink pigments.

18. The system of claim 17, wherein a removal of the voltage substantially ceases the movement of the plurality of the charged ink pigments within the cylindrical symmetric capsules.

19. The system of claim 18, wherein the plurality of charged ink pigments in the cylindrical symmetric capsules substantially remain in a same position as when the voltage was removed due to the presence of local electric fields between the plurality of charged ink pigments in the plurality of cylindrical symmetric capsules and the substrate.

20. The system of claim 17, wherein the first and second electrodes implemented as a multiplexing ITO array.

* * * * *